(12) United States Patent
Smirnov et al.

(10) Patent No.: US 6,546,364 B1
(45) Date of Patent: Apr. 8, 2003

(54) METHOD AND APPARATUS FOR CREATING ADAPTIVE WORKFLOWS

(75) Inventors: Yuri V. Smirnov, Palo Alto, CA (US); Phillip C. Nelson, San Jose, CA (US); Jeffrey B. Winner, Los Altos, CA (US); Yuh-Wen Soung, Saratoga, CA (US); Cristos J. Goodrow, San Francisco, CA (US); John L. Flight, Sunnyvale, CA (US)

(73) Assignee: Impresse Corporation, Sunnyvale, CA (US)

( * ) Notice: Subject to any disclaimer, the term of this patent is extended or adjusted under 35 U.S.C. 154(b) by 0 days.

(21) Appl. No.: 09/216,355

(22) Filed: Dec. 18, 1998

(51) Int. Cl.$^7$ .............................. G06F 9/45; G06F 19/00
(52) U.S. Cl. .............................. 703/22; 700/100; 705/8; 703/2
(58) Field of Search .................. 705/8, 7, 10, 100, 705/105; 700/96, 107; 706/19; 703/6, 2, 22

(56) References Cited

U.S. PATENT DOCUMENTS

| | | | |
|---|---|---|---|
| 3,581,072 A | 5/1971 | Nymeyer | |
| 3,703,006 A | 11/1972 | Sharma | |
| 3,703,725 A | 11/1972 | Gomersall et al. | |
| T918,004 I4 | 1/1974 | Chappell et al. | |
| 3,905,045 A | 9/1975 | Nickel | |
| 3,930,251 A | 12/1975 | Salava et al. | |
| 3,988,570 A | 10/1976 | Murphy et al. | |
| 4,007,362 A | 2/1977 | Sindermann | |

(List continued on next page.)

FOREIGN PATENT DOCUMENTS

| | | |
|---|---|---|
| EP | 0 517 953 A2 | 12/1992 |
| JP | 09034953 | 2/1997 |
| JP | 11110451 | 4/1999 |
| WO | WO 96/10793 | 4/1996 |
| WO | WO 96/16365 | 5/1996 |
| WO | WO 97/07472 | 2/1997 |
| WO | WO 97/28506 | 8/1997 |
| WO | WO 97/29441 | 8/1997 |
| WO | WO 97/31322 | 8/1997 |

OTHER PUBLICATIONS

Kerr, paper published in Proceedings of the 4th IFIP TC5/WG5.7 International Conference on Advances in Production Management Systems, 1991.*

'A Knowledge Based, Integrated Process Planning and Scheduling System for document Preparation'; Roger M. Kerr; XP–000892975; pp. 479–509 (Copy in IDS of paper #7).*

(List continued on next page.)

*Primary Examiner*—Russell Frejd
(74) *Attorney, Agent, or Firm*—Blakely, Sokoloff, Taylor & Zafman LLP

(57) ABSTRACT

A scheduling engine and an associated workflow engine may be configured to build workflows that describe sequences of tasks to be performed in a dynamically changing environment. The workflow engine may be configured to monitor the execution of the tasks within the environment and to provide the scheduling engine with information regarding deviations of task executions from the workflows. When such deviations are detected, the workflow engine may trigger the scheduling engine to rebuild the workflows for as yet uncompleted tasks. The scheduling engine may receive the information regarding the deviations via a declarative model of the physical environment. In general, the tasks may be a set of job requests to be processed in a manufacturing environment (e.g., a print shop). Also, the scheduling engine may be made up of an aggregate planner and a detailed scheduler. Aggregate plans for the jobs may be first made for the jobs and then passed to the detailed scheduler for timelining, etc. Building the aggregate plans may be accomplished by selecting a subset of the job requests according to a procedure for packing bins representing the resources of the manufacturing plant.

12 Claims, 6 Drawing Sheets

U.S. PATENT DOCUMENTS

| | | | |
|---|---|---|---|
| 4,017,831 A | 4/1977 | Tieden et al. | |
| 4,231,096 A | 10/1980 | Hansen et al. | |
| 4,400,783 A | 8/1983 | Locke, Jr. et al. | |
| 4,433,426 A | 2/1984 | Forster | |
| 4,449,186 A | 5/1984 | Kelly et al. | |
| 4,468,750 A | 8/1984 | Chamoff et al. | |
| 4,475,156 A | 10/1984 | Federico et al. | |
| 4,484,522 A | 11/1984 | Simeth | |
| 4,495,582 A | 1/1985 | Dessert et al. | |
| 4,578,768 A | 3/1986 | Racine | |
| 4,584,648 A | 4/1986 | Dlugos | |
| 4,601,003 A | 7/1986 | Yoneyama et al. | |
| 4,648,023 A | 3/1987 | Powell | 364/156 |
| 4,796,194 A | 1/1989 | Atherton | |
| 4,839,829 A | 6/1989 | Freedman | |
| 5,016,170 A | 5/1991 | Pollalis et al | 364/401 |
| 5,053,970 A | 10/1991 | Kurihara et al. | 364/468 |
| 5,212,791 A * | 5/1993 | Damian et al. | 395/650 |
| 5,229,948 A | 7/1993 | Wei et al. | |
| 5,233,533 A | 8/1993 | Edstrom et al. | 364/468 |
| 5,278,750 A | 1/1994 | Kaneko et al. | 364/401 |
| 5,287,194 A | 2/1994 | Lobiondo | 358/296 |
| 5,291,394 A | 3/1994 | Chapman | 364/401 |
| 5,291,397 A | 3/1994 | Powell | |
| 5,369,570 A * | 11/1994 | Parad | 705/8 |
| 5,406,476 A | 4/1995 | Deziel, Jr. et al. | 364/402 |
| 5,432,887 A | 7/1995 | Khaw | |
| 5,463,555 A | 10/1995 | Ward et al. | |
| 5,504,568 A | 4/1996 | Saraswat et al. | 355/308 |
| 5,557,367 A | 9/1996 | Yang et al. | 355/202 |
| 5,574,640 A | 11/1996 | Sycara et al. | 364/401 |
| 5,592,602 A | 1/1997 | Edmunds et al. | 395/174 |
| 5,630,070 A * | 5/1997 | Dietrich et al. | 395/208 |
| 5,729,790 A | 3/1998 | Conley et al. | 399/77 |
| 5,734,837 A | 3/1998 | Flores et al. | 395/207 |
| 5,748,899 A | 5/1998 | Aldrich | 395/200 |
| 5,754,857 A | 5/1998 | Gadol | 395/680 |
| 5,757,669 A | 5/1998 | Christie et al. | 364/514.006 |
| 5,765,139 A | 6/1998 | Bondy | 705/8 |
| 5,768,506 A | 6/1998 | Randell | 395/200 |
| 5,778,364 A | 7/1998 | Nelson | 707/6 |
| 5,794,207 A | 8/1998 | Walker et al. | |

OTHER PUBLICATIONS

"Introduction to Algorithms"; Cormen, Leiserson and Rivest, 1989, Published by MgGraw–Hill Book Company; pp 86–90 & 541–543.*

PCT International Search Report; International Application No. PCT/US99/24177; Apr. 6, 2000.

PCT International Search Report; International Application No. PCT/US99/24178; Apr. 6, 2000.

PCT International Search Report; International Application No. PCT/US99/24381; Feb. 29, 2000.

PCT International Search Report; International Application No. PCT/US99/24193; Feb. 5, 2000.

PCT International Search Report; International Application No. PCT/US99/24131 Dec. 4, 1998.

PCT International Search Report; International Application No. PCT/US 24132; Feb. 22, 2000.

"A Knowledge Based, Integrated Process Planning and Scheduling System for Document Preparation"; Roger M. Kerr; XP–000892975; pp. 497–506.

"Heuristic Knowledge Representation of Production Scheduling: An Integrated Modeling Approach"; Sung Joo Park and Jong Woo Kim; XP–000893055; pp. 325–339.

"From Contemporary Workflow Process Automation to Adaptive and Dynamic Work Activity Coordination and Collaboration"; Amit Sheth; XP–002135795 pp. 24–27.

Towards Evolutionary and Adaptive Workflow Systems— Infrastructure Support Based on Higher–Order Object Nets and CORBA; Ingo ClaBen, Herbert Weber and Yanbo Han; XP–002135793; pp. 300–308.

"A Fine Mes"; State of the Art; Jim Esch; Petersborough, NH, US; No. 12; pp. 67, 68, 70, 74, 75.

"Simulation System for Real–Time Planning, Scheduling, and Control"; Glenn R. Drake and Jeffrey S. Smith; pp. 1083–1090.

"Electronic Contracting with COSMOS–How To Establish, Negotiate and Execute Electronic Contracts on the Internet"; F. Griffel, M. Boger, H. Weinrcich, W. Lamersdorf and M. Merz; XP–002129707; pp. 46–55.

"Workflow Management Coalition Terminology & Glossary", Document No. WFMC–TC–1011, Document Status—Issue 2.0, Jun. 1996, (55 pg.).

"Workflow Management Coalition, The Workflow Reference Model", Document No. TC00–1003, Document Status—Issue 1.1, Nov. 29, 1994, (46 pg.).

"Workflow Management Coalition, Workflow Security Considerations—White Paper", Document No. WFMC–TC–1019, Document Status—Issue 1.0, Feb. 1998, (15 pg.).

"Workflow Management Coalition, Workflow Client Application (Interface 2), Application Programming Interface (WAPI) Specification", Document No. WFMC–TC–1009, Oct. 1997, Version 2.0e (Beta), (178 pg.).

* cited by examiner

METHOD AND APPARATUS FOR CREATING ADAPTIVE WORKFLOWS

FIELD OF THE INVENTION

The present invention involves the selection of jobs for execution in manufacturing processes from declarative descriptions of the environment in which the processes are performed.

BACKGROUND

Within manufacturing environments, the questions of deciding what products to produce (assuming the environment is capable of producing more than a single product), when to produce them, how much of each to produce and whether to accept new orders for different products must all be weighed against the realities of the various constraints imposed upon and within the environment. To assist in making such decisions, computational tools may be used to determine which products to produce and/or when to produce them. These tools are sometimes divided into two aspects: planning tools and scheduling tools. The term planning is used to identify those activities, and the relations therebetween, required to accomplish a set of goals. Scheduling then becomes the assignment of specific resources and time windows to the actions identified in the plan.

Although the use of such tools may assist in answering the questions posed, alone they cannot be relied upon to produce useful results. For example, if such tools are used in a static fashion, i.e., so that they are not used in a manner that accurately reflects the changes in the environment being experienced, they cannot be expected to produce reliable results. Further, such tools will not necessarily yield workflows that reflect detailed sets of instructions for how to assemble the products of interest. That is, where workflow specify the order in which various resources are to be employed to produce the products and, hence, act as assembly instructions for the product, scheduling tools may only generate worklists for individual items of equipment. What is needed therefore is an improved scheme for addressing the above-described needs of manufacturing environments.

SUMMARY OF THE INVENTION

An adaptive workflow system that includes a scheduling engine and a workflow engine is provided. The scheduling engine may be configured to build workflows that describe sequences of tasks to be performed in a dynamically changing environment. The workflow engine may be configured to monitor the execution of the tasks within the environment and to provide the scheduling engine with information regarding deviations of task executions from the workflows. When such deviations (e.g., changes in the environment) are detected and/or when new tasks are added, the workflow engine may trigger the scheduling engine to rebuild the workflows for as yet uncompleted tasks. The workflows may define start and end times, etc. for the tasks.

In general, the tasks may be a set of job requests to be processed in a manufacturing environment (e.g., a print shop). In such a scheme, the scheduling engine may be made up of an aggregate planner and a detailed scheduler. Aggregate plans that describe which jobs to do and how to do them may be first made and then passed to the detailed scheduler for timelining, and specific resource allocation, etc.

In some cases, the manufacturing environment may be represented by a declarative model that describes the bills of materials and bills of resources for the manufacturing environment. Alternatively, the manufacturing environment may be represented by a model that includes the resources consumed by the job requests.

Ultimately, workflows may be generated from the detailed schedule. The workflows represent procedural steps to accomplish the process to be performed within the manufacturing environment. In such cases, generating a workflow may be accomplished by choosing one or more of a number of paths through the model (e.g., using the hierarchical aggregate planning and detailed scheduling approach), each of the paths comprising an alternating series of one or more of the state nodes and one or more of the task nodes with any predecessor state node in one of the paths representing a precondition for a subsequent task node along the one of the paths and any following state node of the subsequent task node along the one of the paths representing a result of applying one or more actions that correspond to that task node.

In general though, any of a number of model representations may be used. Thus, generating a workflow may be accomplished by choosing any one of a plurality of feasible routes for completion of the process defined by the model; by choosing an optimal one of a plurality of routes for completion of the process defined by the model; or by choosing one of a plurality of routes defined by the model according to one or more user-defined criteria for route selection. The routes so chosen may define bills of resources for the real world environment defined by the model. New workflows may be generated in response to an update to the model.

Further details of these and other embodiments will be discussed below, however, it should be remembered that these are merely examples of implementations of the present invention.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
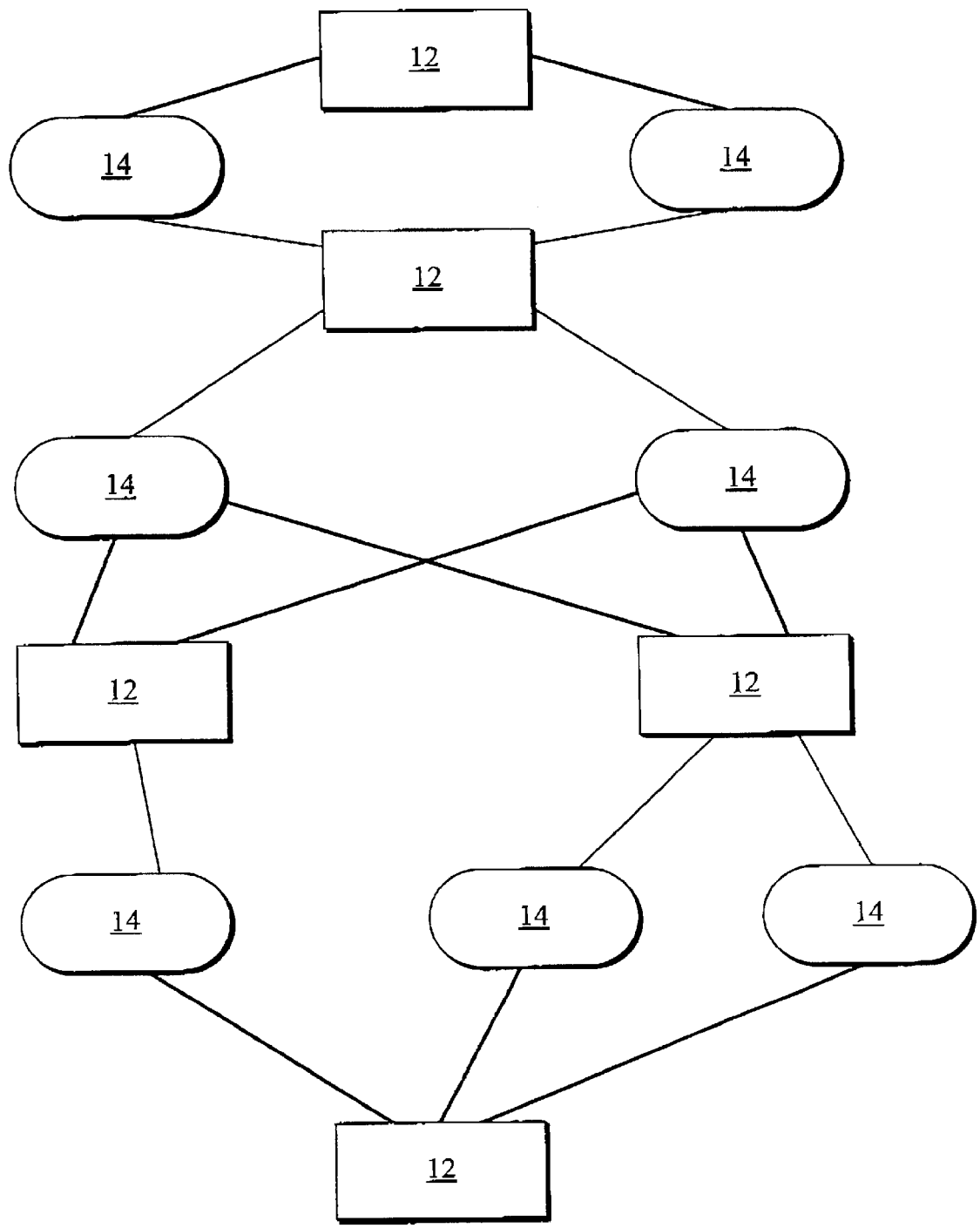
FIG. 1 illustrates a model having task nodes and state nodes organized for use according to an embodiment of the present invention.

A scheme for producing workflows for a set of jobs to be performed in a real world environment is described herein.

Many of the techniques to be discussed will make reference to a manufacturing environment (and, in particular, a print shop environment) in which similar types of products are produced in similar ways. However, upon review of this specification, those of ordinary skill in the art will recognize that the planning techniques discussed herein may find application in a variety of environments. Therefore, in the following description the illustrated embodiments should be regarded as examples only, and should not be deemed to limit the scope of the present invention.

Before describing the workflow creation scheme in detail, it is helpful to present an overview. The method makes use of a declarative model of the real world environment. The model is used to generate detailed schedules and workflows, i.e., procedural steps to be followed in accomplishing the process defined by the model. In one embodiment, the model may be regarded as a directed graph made up of state nodes and task nodes. The task nodes and state nodes are interconnected with one another in such a way so as to define one or more paths through the directed graph, with each path defining a route to a completed product. Each of the paths includes an alternating series of one or more of the state nodes and one or more of the task nodes. In some cases, two or more of the paths may share one or more task nodes and/or state nodes.

Generating the actual workflows may be accomplished using a scheduler that is permitted to access the model. The scheduler uses rules to determine the criteria by which the workflows are produced. In some cases, generating the workflows may involve choosing any of a number of feasible routes defined by the model. However, in other cases, more sophisticated criteria for workflow generation, such as optimizing for cost, value, execution time or other (e.g., user-defined) criteria may be specified and workflows generated accordingly.

Because of the complexity of the scheduling task, the present scheme employs a hierarchical methodology in which an aggregate plan is first produced. Using the aggregate plan, a detailed schedule for the job requests may then be determined. The aggregate plan is arrived at through the use of a multidimensional bin packing scheme that accommodates contingencies. The "bins" represent capacities of the manufacturing processes represented in the model. Thus, given a list of possible jobs to be performed, the multiple possible ways in which those jobs may be performed in terms of the resources they use and consume, and the capacities of those resources, the bin packing scheme is applied in order to arrive at an aggregate plan for doing the jobs. From this aggregate plan, a detailed schedule (i.e., one that includes start and end times, etc.) may be produced.

As the tasks are processed according to the detailed schedule, a workflow engine is used to monitor the real world environment. For example, the workflow engine may monitor the completion of tasks, starting of tasks and/or various equipment/resource states. This information may be used to determine when rescheduling operations are needed. Thus, if the workflow engine detects that the execution of the tasks is deviating from the established workflow (e.g., due to equipment failures, lack of consumable resources, operator error, etc.), the workflow engine may trigger the scheduler to build new workflows for the remaining tasks. Any new workflow(s) would need to be built according to the current state of the real world environment. Hence, the workflow engine is also configured to update the model of the environment so that the current state of the real world is accurately reflected.

To better understand the above-described method, first consider a hypothetical print shop. The print shop includes a number of machines, which are used in the printing of books and similar articles. For example, the print shop includes a number of printers, each of which is capable of producing a document, printed on paper or another material, from a computer-readable file (e.g., a PostScript™ file). In addition, the print shop includes special printers for producing covers. Besides printers, the print shop may include machines for binding the various documents and covers together and other machines for cutting the resulting products to size. In general, all of the products (e.g., books) produced by the print shop are produced using similar processes, but any of the end products may be created in any of a variety of ways. For example depending upon the availability of resources (e.g., the printing, binding and cutting machines) and materials (e.g., paper and ink for the printers, cover stock, etc.) one route may be chosen over another. Thus, the print shop is an example of a homogeneous manufacturing environment.

Consider now the following scenario. A number of jobs, perhaps each at various stages of completion and each having certain deadlines for completion, are waiting to be processed. Each job has an associated cost of completion and each completed job has an associated value. Any job not completed on time carries an associated penalty, which may or may not have a linear relationship with the delay. The task facing the owner of the hypothetical print shop then, is to decide how best to employ the available resources and materials to complete the existing job requests within their designated time frames while optimizing for cost/value. In other words, the print shop owner needs to determine what work to do, when to do it, what resources to apply/utilize, etc., to complete the products. To this task can be added the complication that while the shop is running and without disrupting the in-progress operations, the print shop owner would like to be able to accept new orders, each of which will carry its own completion time deadlines, costs and values.

To assist the print shop owner in these and other matters, the model illustrated in FIG. 1 is introduced. Model 10 represents the print shop environment in terms of its bill of materials and bill of resources. Stated differently, model 10 represents the print shop jobs to be performed in terms of the resources those jobs consume, along with the alternative paths therefor. It should be appreciated that model 10 may be instantiated as a computer-readable file and may thus be regarded as a virtual representation of the bill of materials and bill of resources. Importantly, the manner in which the inventory items that make up the bill of materials are interconnected to tasks that make up the bill of resources implicitly defines the workflow in the print shop.

Before going further, it is helpful to define some terms. A bill of materials, as used herein, is a summary that defines a product structure. More than merely a parts list, a bill of materials provides some idea of how a product is assembled from its constituent parts. In some cases, it may indicate the types and quantities of subassemblies required to produce the product. Although the bill of materials shows the assembly chain for the product, it does not provide any information as to how or when the assembly is to be completed. A bill of resources on the other hand, is a precise list of the available reusable resources that may be employed to assemble the product. For example, the various machines that are located on the print shop floor comprise at least a portion of the print shop's bill of resources. In some cases, outside vendors and suppliers may be part of the bill of resources.

Workflows then may be regarded as detailed sets of instructions for how to assemble the product of interest. The workflow specifies the order in which various resources are employed to produce the items on the bill of materials and, hence, acts as assembly instructions for the product. Model 10 is unique in that it integrates a bill of materials with a bill of resources to provide a logical flow structure that may be easily used to identify available workflows. That is, one or more workflows may be regarded as instances of the model.

Returning to FIG. 1, model 10 includes a collection of state nodes 12 and task nodes 14. The nodes 12 and 14 are interconnected in such a fashion so as to form a state transition graph. That is, task nodes 14 define processes or actions by which predecessor state nodes 12 are transformed to successor state nodes 12. The processes or actions defined by the task nodes 14 are those associated with the available resources of the manufacturing or other process defined by model 10 (e.g., the print shop machines and/or their associated operators for the above print shop example). Thus, in model 10, the state nodes 12 represent intermediate states (or milestones) which have been identified as comprising the bill of materials. All state nodes 12 are the outcome or result of a task node 14.

In model 10, state nodes 12 and task nodes 14 always appear in alternating order as one proceeds along a path through the model. Paths are defined as complete routes to a final product and therefore may be regarded as workflows or production plans. Separating the state nodes 12 and task nodes 14 in this fashion provides clarity in the logical semantics of parallel paths. For example, all inputs to a task node 14 represent logical AND requirements. That is, the action associated with a given task node 14 cannot be performed until all of the associated inventory items represented by the state nodes 12 which feed the task node 14 are available. All inputs to a state node 12, on the other hand, represent logical ORs. That is, the inventory item defined by a given state node 12 may be produced by any of the actions associated with any immediate predecessor task node 14.

In model 10, state nodes are represented using rectangles while task nodes are represented using ovals. The logical flows that interconnect the nodes are depicted with thick lines representing logical ANDs and thin lines representing logical ORs.

Those of ordinary skill in the art will appreciate that model 10 may exist as a virtual representation of the associated manufacturing environment, for example, as may be present in a computer system, a computer-readable storage medium or other database environment. In some cases, model 10 may exist in various component parts in one or more locations of a distributed processing environment. Regardless of its physical location or makeup, however, it should be appreciated that model 10 may be continuously updated with information regarding the real-world manufacturing environment that it represents. In this way, as resources are taken off line or added, model 10 is available to identify new production plans.

Within the virtual representation, a task node 14 may be defined with various attributes. For example, each task node may have an associated resource that actually performs the actions represented by the task node. In addition, each task node 14 will have an associated capacity, which may represent the resource's required time for completing the task. Such information may become useful for identifying and avoiding bottlenecks in the manufacturing environment when using model 10 to plan/schedule multiple jobs. The task nodes 14 also have defined predecessors, which in this case are represented by the state nodes 12. As indicated above, however, the attribute list need not include semantic definitions, because the structure of model 10 is such that the node type inherently defines the logical semantics. Other attributes relating to the rules and variants associated with each task node 14 may also be included.

State nodes 12 may also have associated attributes. Among these may be an indication of predecessor and/or successor actions/events. Other rules may also form attributes. In general, all nodes of model 10 will have associated rules and each rule may be associated with a successor node of the model. During processing of a real world job in the manufacturing environment represented by model 10, after an action associated with a node has been completed, all rules of the node may be evaluated. If a rule is satisfied, the job may be passed to the successor node associated with the rule. If more than one rule is satisfied, the job may be passed to multiple successor nodes, as represented by the existence of multiple parallel paths in the model 10.

Within this representation, each manufacturing process represented by a task node 14 requires certain resources to complete its associated task. These resources may be divided into materials and assets. Materials are those items which can be used only once (i.e., consumables) and are completely used up by the task that uses them. In the print shop environment, examples of materials include paper, toner (for the printers, etc.) and RIPed (raster image processed) images, etc. Assets are those resources that are not consumed by the processes that use them. Examples include the actual print machines, the physical plant, operators, etc. (i.e., assets are reusable resources). Both materials and assets may be represented in model 10.

To summarize, within the alternating structure of state nodes and task nodes, a predecessor state node in one of the paths (i.e., workflows) represents a precondition for a subsequent task node along that path. Similarly, a state node following a preceding task node along the one of the paths represents a result of applying one or more actions (e.g., manufacturing processes or sub-processes) that correspond to that task node. State nodes and task nodes may be chosen to represent any appropriate level of item or material (in the case of state nodes) or process (in the case of task nodes). In one embodiment, for example, task nodes are introduced into the model to represent significant steps in the processing of materials in the manufacturing environment.

It is important to recognize that the manufacturing processes or sub-processes represented by the individual task nodes may correspond to on-site or off-site processes (e.g., where subcontractors or remote manufacturing facilities may be employed). In general then, each task node represents a transformation process for an item or material from a preceding state to a following state. The present model is flexible in that multiple task nodes may be used to represent multiple ways of transforming the item or material from the preceding state to the following state. In other words, different actions or processes (whether performed by humans, machines or both) that lead to the same result may be represented by different task nodes, or, if preferable, by the same task node (e.g., depending upon the granularity of the model chosen to represent a particular manufacturing environment). Indeed, because of this flexibility, the model may be hierarchically arranged such that each task node may be expanded to its own directed graph representation using the model structure described herein.

Another interesting feature of the present model is the manner in which the logical semantics of the routes defined by the directed graph are implicit in the model structure itself. For example, all inputs to a task node implicitly represent logical AND requirements. Because of the hierarchy defined by the directed graph, it is axiomatic that the action (or actions) associated with a particular task node cannot be performed until all of the associated materials or items represented by the state nodes which feed that task node are available. The model structure itself makes this logical argument explicit, without having to introduce additional attributes when defining the task node. All inputs to a state node, on the other hand, represent logical ORs. That is, the inventory item or material defined by a particular state node may be produced by any of the actions associated with any immediate predecessor task nodes. Again, the structure of the present model itself defines these relationships, without requiring any additional defining attributes for a state node.

Figure 2:
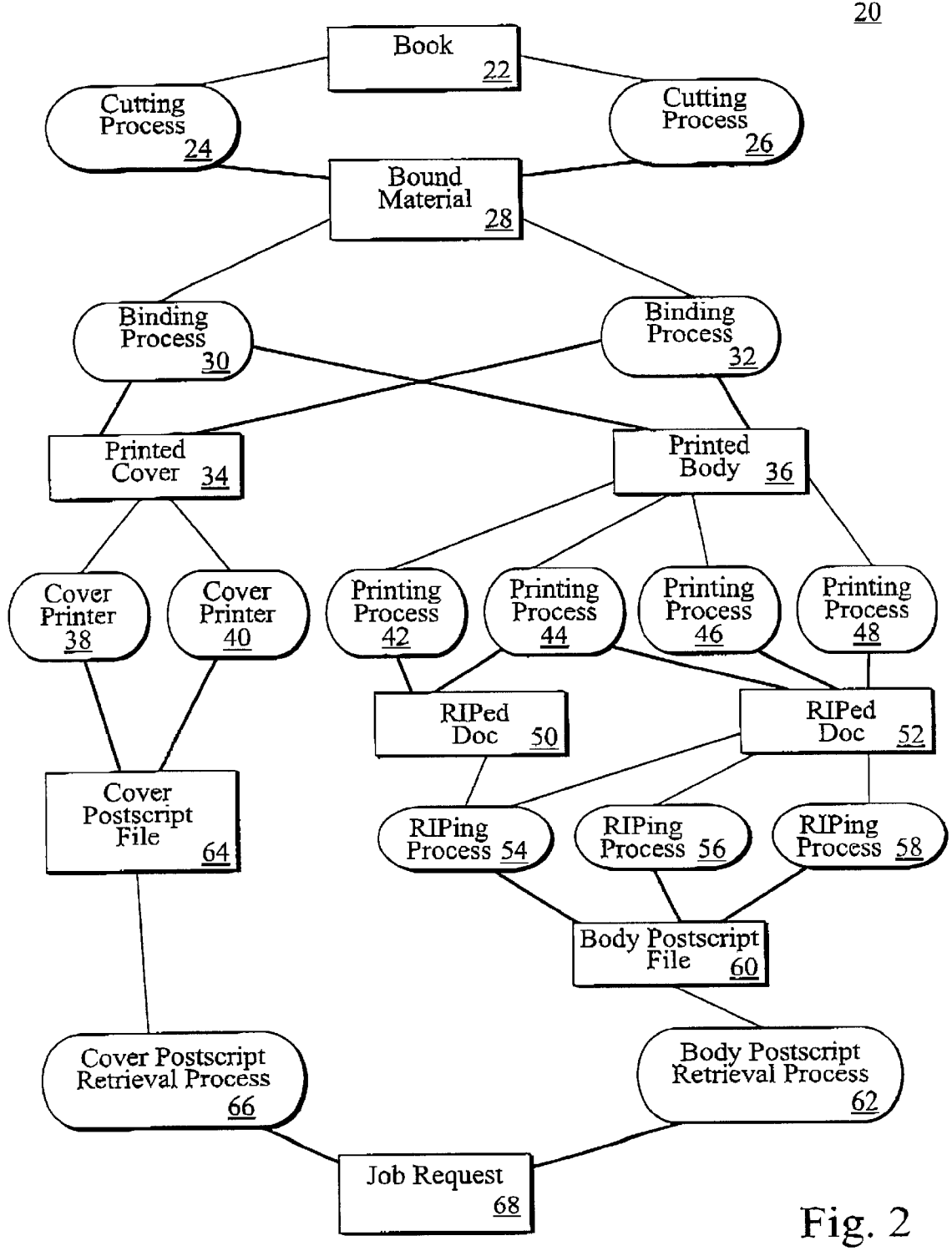
FIG. 2 illustrates a detailed model of a hypothetical print shop environment.

FIG. 2 presents a fully detailed model 20 of the hypothetical print shop. Model 20 is created using a "top-down" approach, wherein the end product, book 22, is regarded as the outcome of the entire manufacturing process. Model 20 is illustrated using the state node/task node representation discussed above, where inventory items which make up the bill of materials for a book 22 are represented using rectangles and manufacturing processes which act on the inventory items are represented using ovals. Similar logical flows to those discussed above are inherent in the node structure and are represented in model 20 with thick lines representing logical ANDs and thin lines representing logical ORs.

Having decided that book 22 represents the final state (i.e., the output of the print shop manufacturing environment), it is recognized that this state must be the result of some action. In the print shop hypothetical, a book is produced once it is cut to shape; thus, book 22 is the result of one of either of two cutting processes 24 or 26. Notice that model 20 accurately reflects the logical OR nature of these alternative processes.

Because all task nodes (by which cutting processes 24 and 26 are represented in model 20) represent actions that are employed on one or more items of a bill of materials, it follows that the inputs to cutting processes 24 and 26 must be represented by state nodes. In this case, before a book can be cut to size by either of cutting processes 24 or 26, some bound material 28 must exist. The bound material 28 is represented in model 20 by the predecessor state node to the task nodes associated with the two cutting processes. Notice that the logical AND requirement for the bound material is also represented in model 20, thus illustrating the need for the bound material 28 to exist before the cutting process may be commenced.

If bound material 28 is available, it follows that some binding process must have been applied. Thus, model 20 accommodates the act of binding with task nodes representing two hypothetical alternative binding processes 30 and 32. As shown, these processes act on the predecessor inventory items, namely printed cover 34 and printed body 36. Here, the body of the book 22 refers to all material included within the cover. The printed cover 34 and printed body 36 are represented using appropriate state nodes and the various logical combinations of these items, which may be acted upon by the two binding processes are also illustrated. It should be appreciated, however, that the very node definition will lead to the logical flow illustrated in model 20 and no additional rules need be defined.

Both the printed cover 34 and the printed body 36 are the result of independent printing processes. For example, printed cover 34 may be produced by either of cover printing processes 38 or 40, while printed body 36 may be produced by any of printing processes 42, 44, 46 or 48. Thus, appropriate task nodes representing these various processes are introduced into model 20. Again, the node definition itself has provided an immediate indication of the logical paths available within the manufacturing process.

The printing processes 42, 44, 46 and 48 each act upon a RIPed document, although some printing processes may only act upon certain types of RIPed documents. In the hypothetical print shop environment, two types of RIPed documents 50 and 52 may be produced, but each by independent RIPing processes 54, 56 and 58. Thus, these individual inventory items are represented by state nodes assigned to the RIPed documents 50 and 52 and the various RIPing processes 54, 56 and 58 are represented using appropriate task node.

The RiPing processes themselves act upon PostScript files 60, represented by an appropriate state node. The PostScript file 60 is produced in response to a retrieval process 62, such as loading a PostScript file.

For the cover, no RIPing process is required; thus printed cover 34 is produced directly from a cover PostScript file 64. As for the body PostScript file, cover PostScript file 64 is retrieved by a retrieval process 66. The retrieval processes 62 and 66 are carried out in response to a job request 64.

Notice then that model 20 may be created by examining the prerequisites and/or preconditions that must exist in order to execute a particular task, and also determining the actions that are required to arrive at a particular inventory item. These prerequisites and actions are then combined in the logical hierarchy discussed above to form a single model in which the bill of materials (represented by the individual inventory items) and the bill of resources (represented by the collection of actions) are integrated with one another. This procedure may be applied to any manufacturing process, but is especially applicable to homogeneous manufacturing processes such as the print shop example, because a number of products may be produced using similar processes.

Although model 20 has not illustrated the integration of consumables, such integration is easily achieved. For example, consumables may be represented as predecessor state nodes to the tasks that consume them. Thus, any or all of the printing processes 42, 44, 46 and/or 48 may draw upon paper, toner and other materials in addition to the RIPed documents. Such materials may be represented as state nodes similar to the RIPed documents 50 and 52, with the exception that the state would have to be defined to indicate its consumable status. Thus, in some embodiments, state nodes representing consumables may be implemented so that their available/not available status must be defined prior to execution of a subsequent task. Preferably, direct feedback from the manufacturing environment may be used to update this status in real time.

From the above, it should be apparent that when the present model is used to represent a real-world manufacturing environment, any route through the model to a completed product automatically provides a complete bill of materials and bill of resources for that product. Further, alternative routes (and, hence, alternative bills of materials and bills of resources) are also provided. Thus, a scheduler may make use of the model to assist in the efficient employment of resources within the manufacturing environment. In essence, the scheduler will be required to perform route selection according to rules by which such routes may be chosen to achieve desirable or optimal results.

Figure 3:
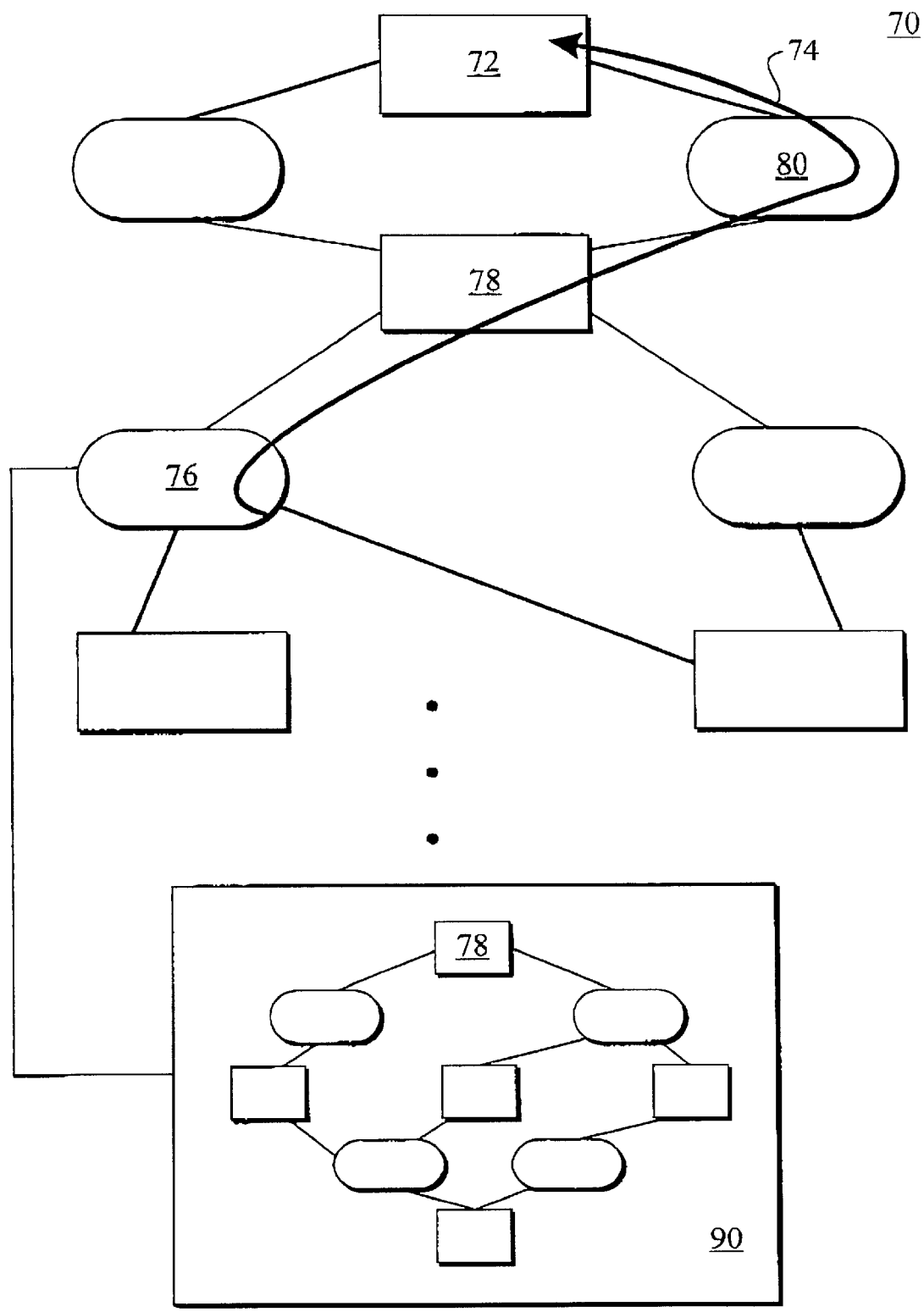
FIG. 3 illustrates an example of the hierarchical nature of a model having task nodes and state nodes organized for use according to an embodiment of the present invention.

As indicated above, an embodiment of the model may be hierarchical in nature in that one or more task nodes themselves may be further represented by other embodiments of the model. An example of this hierarchical nature is illustrated in FIG. 3. In the drawing, a model 70 is illustrated in part. Model 70 is a virtual representation of a manufacturing environment that produces product, as represented by state node 72. Notice that multiple routes are defined by model 70, each route including its own state nodes (shown as rectangles) and task nodes (shown as ovals), some of which may be shared between routes. As explained above, these various routes each define bills of materials and bills of resources that may be used to produce the final product. A particular route (i.e., a workflow) is defined by path 74, which includes task node 76, state node 78 and task node 80. When the process represented by task node 80 operates on the item represented by state node 80, the product represented by state node 72 is produced.

Assume now that model 70 is used by a manufacturer that subcontracts the work to be performed by the process represented by task node 76. For the manufacturer, this process is a self-contained unit that ultimately delivers the item represented by state node 78. The manufacturer need not be concerned with the manner in which the item represented by state node 78 is actually produced. Thus, model 70 need only include a representation of the process used to deliver that item (i.e., the granularity of task node 76 is such that an entire subcontracted manufacturing process is represented).

The subcontractor employed by the manufacturer, however, is very much concerned with the manufacturing process represented by task node 76 in model 70. Indeed, as shown in FIG. 3, the entire subcontracted manufacturing environment may itself be represented by a model 90, which has similar structure to that of model 70. That is, model 90 is a break down of task node 76, created to have the same logical semantic structure between task nodes and state nodes as in model 70. Because model 90 uses the same directed graph approach, should the manufacture who relies upon model 70 to assist in scheduling and other tasks (e.g., order promising, etc.) wish to identify potential bottlenecks, model 90 could be substituted for task node 76 in model 70. In such a case, the scheduler could identify problems that might not otherwise be detectable by the manufacturer. Thus, model 70 is hierarchically arranged such that any task node may be expanded to its own directed graph representation using a similar model structure.

Figure 4A:
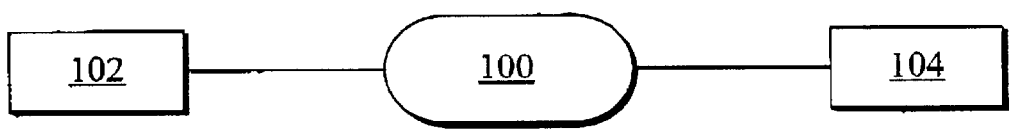
FIGS. 4A and 4B illustrate a printing process modeled by one or more task nodes according to a desired level of granularity for a model having task nodes and state nodes organized for use according to an embodiment of the present invention.

Task nodes may also be defined at various levels of granularity as follows. In FIG. 4A, a task node 100 represents a transformation process between state nodes 102 and 104. Returning to the print shop metaphor discussed above, task node 100 may represent a document printing process employing any printer and any printer operator. At this level of granularity, the process represented by task node 100 is very coarse, in that the print shop owner is concerned only with the document printing process and not individual printing machines/operators.

Figure 4B:
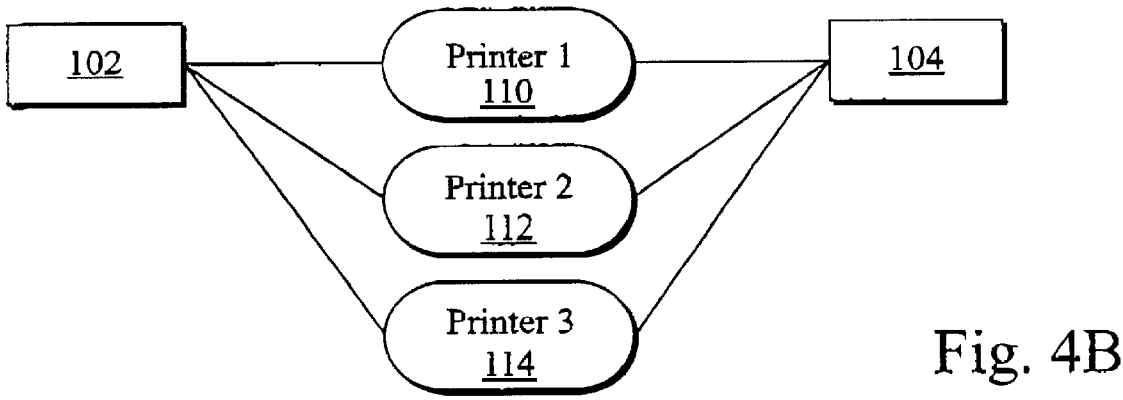

FIG. 4B now illustrates the same document printing process, however, this time task nodes 110, 112 and 114 have been used to represent the process as performed by three different document printing machines. At this level of granularity, a model that included task nodes 110, 112 and 114 would provide different routes to produce the item represented by task node 104, differentiated by printing machine, but not by individual operator.

Similar to the manner in which task nodes may be employed at various levels of granularity, state nodes may also be used to represent any desired inventory item in the production process of the manufacturing environment being modeled. Thus, entire subassemblies may be represented in some cases, while in other cases lesser items may be included. Of course, corresponding task nodes will be needed to properly represent the processes used to produce the items represented by the state nodes.

Figure 5:
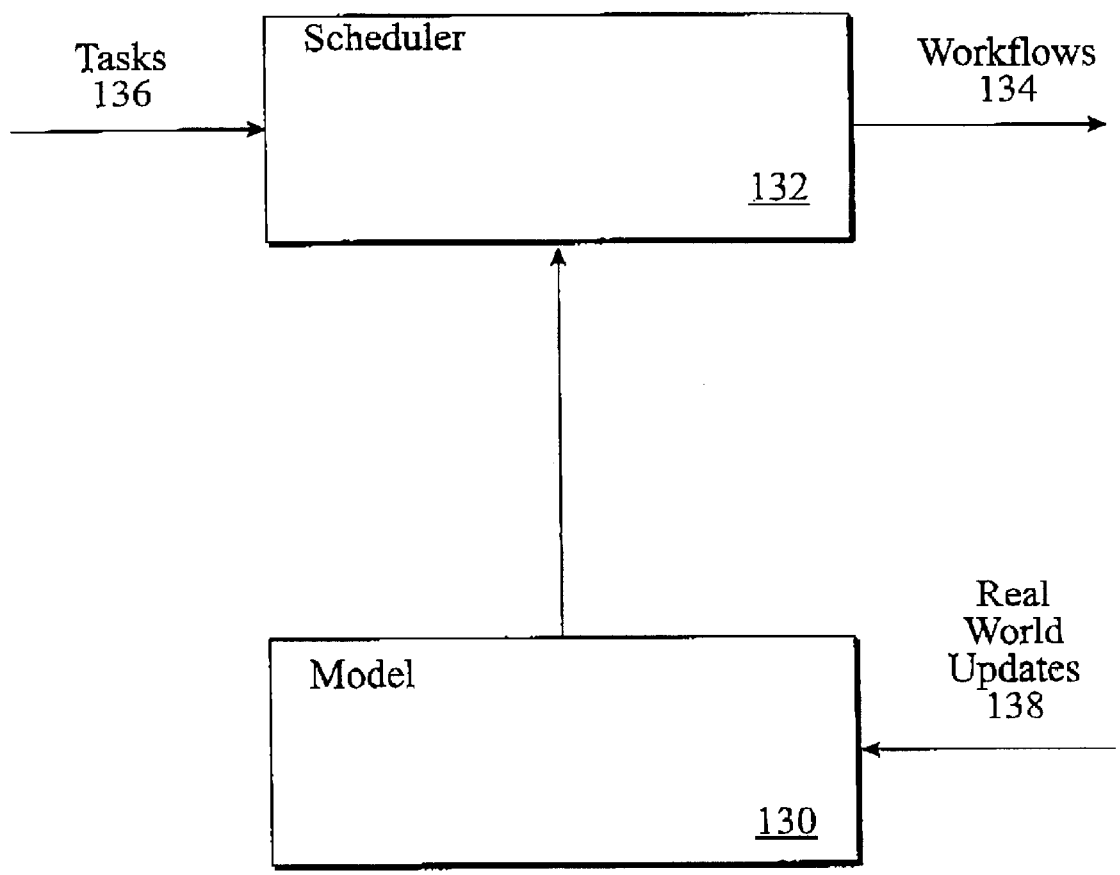
FIG. 5 illustrates an example of a scheduling system employing a model having task nodes and state nodes organized according to an embodiment of the present invention.

FIG. 5 illustrates one example of how a scheduler may make use of a model configured in accordance with the teachings presented herein. Note that the scheduler and the model may each be implemented in a computer system having a general-purpose processor and an accompanying memory and input/output system. The scheduler, for example, may represent executable or other code representing a series of computer-readable instructions to be executed by the processor in accordance with the discussion provided below. Similarly, the model may exist as a computer readable database or other file accessible by the processor (e.g., stored in memory).

Model 130 is configured as a directed graph to represent a real-world manufacturing environment as described above. Thus, model 130 includes multiple routes between alternating series of state nodes and task nodes to represent various ways in which a product may be produced. Scheduler 132 is permitted to access model 130 so as to produce workflows 134 in response to tasks 136. Tasks 136 may represent orders that are being placed for processing within the manufacturing environment, carry-overs from previous orders (e.g., that were not completed during previous shifts, etc.) or other requirements. Workflows 134 represent the route through model 130 chosen by scheduler 132 for completion of individual tasks 136. That is, each workflow 138 represents a detailed set of instructions to complete a task (i.e., to produce a product called for by the associated task 136). Model 130 may be continually updated to accurately reflect the real-world manufacturing environment, which it represents. Thus, as various operators take breaks or are replaced with new workers, and/or as machines are rotated in and out of service and/or as items in a particular bill of materials are completed or delayed due to equipment failure, model 130 is updated. This allows scheduler 132 to update workflows 134 to account for the changes in the real world environment.

To produce workflows 134, scheduler 132 may determine which of the number of possible routes represented in model 130 are available to process each task 136 and may then provide work assignments accordingly. For example, scheduler 132 may determine which routes are unavailable by determining which processes represented by task nodes in model 130 are already filled to capacity and decide to schedule new tasks 136 along routes that do not include those task nodes. Of course, many other scheduling methods are known in the art and may be used to produce the workflows 134. Preferably, scheduler 136 is a hierarchical process that incorporates an aggregate planning level and a detailed scheduling level as discussed below.

Figure 6:
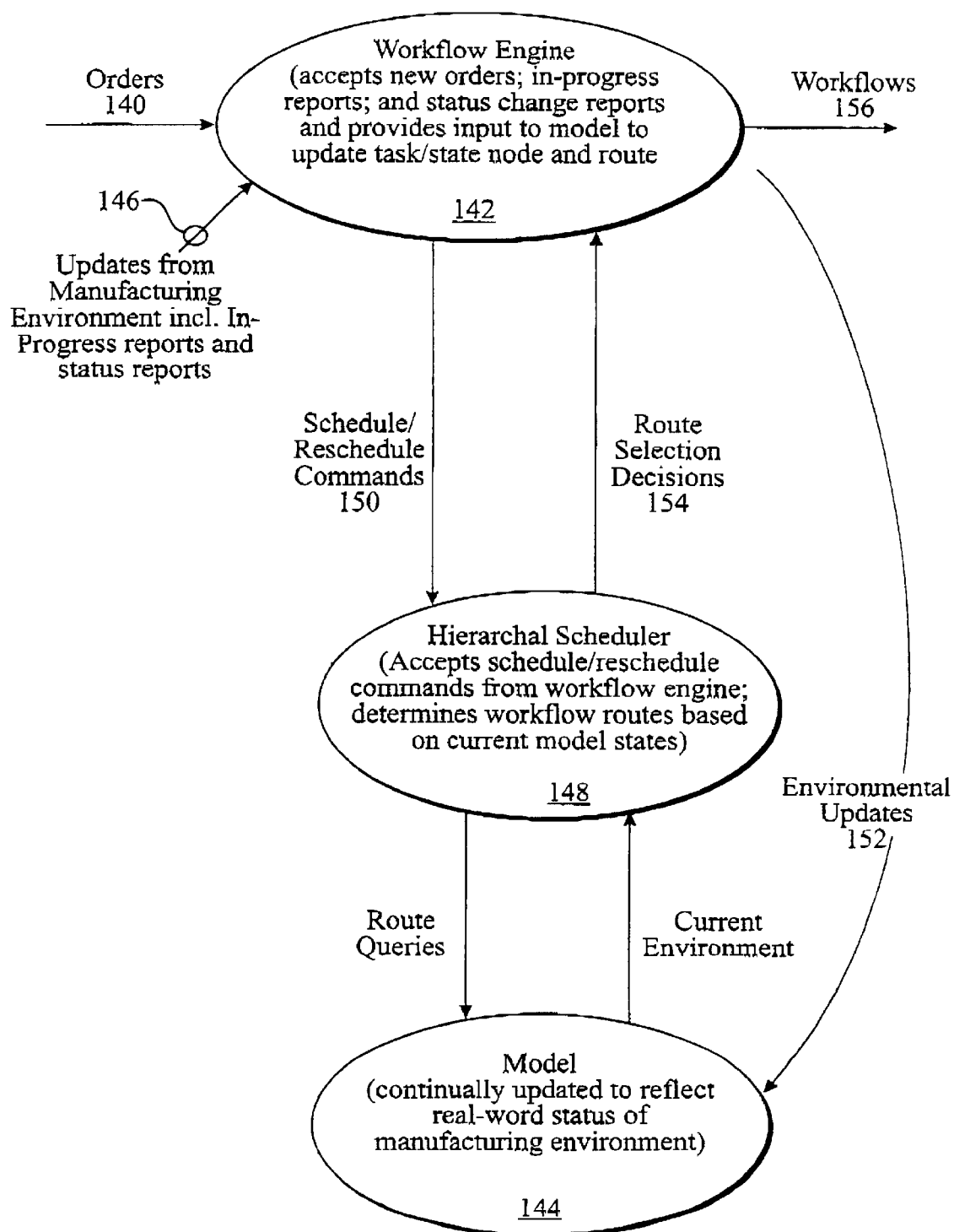
FIG. 6 illustrates a further example of a scheduling system configured in accordance with an embodiment of the present invention.

FIG. 6 illustrates an alternative system for generating workflows in accordance with yet another embodiment of the present invention. In the system, orders 140 are applied to a workflow engine 142. The orders may represent requests for products that are produced in a manufacturing environment represented by model 144. Model 144 may be a model organized in the fashion discussed above (e.g., as a directed graph with alternating series of state nodes and task nodes, etc.) or a model organized in another fashion. In response to orders 140 and/or updates 146 received from the real world environment represented by model 144, workflow engine 142 calls upon scheduler 148 to provide scheduling information.

These calls are made in the form of schedule or reschedule commands 150. In response, scheduler 148 queries model 144 to determine available routes for product completion that may be available. For example, where model 144 is configured as described above, scheduler 148 may examine routes as alternating series of state nodes and task nodes, and assess each complete route through the model 144 on the basis of one or more selection criteria. These criteria may be as simple as finding a viable route (i.e., any complete path through the model), to more complex selections involving a determination of the effect of loading particular manufacturing processes (as represented by task nodes) with additional projects (corresponding to new orders, etc.), to custom value maximizing selection decisions. Again, it is preferable that scheduler 148 perform this route selection procedure in a hierarchical fashion, employing an aggregate planning level and a detailed scheduling level.

In any event, model 144 accurately reports the current state of the manufacturing environment to scheduler 148. This state is continually updated according to updates 152 provided by workflow engine 142. Workflow engine 142 receives update information (e.g., representing task completions, state availability, process availability, resource availability, etc.) and provides the necessary update information 152 that allows model 144 to accurately reflect the current state of the real world.

Scheduler 148 relies on the real world state reflected by model 144 to produce route selection decisions 154. These route selection decisions (made in accordance with the scheduler's rules for such selections) form the basis for the workflows 156 returned by workflow engine 142. Such workflows may be returned any time new orders 140 are placed, in response to events that affect the real world environment represented by model 144, or upon user request (e.g., at the start of a new shift in the manufacturing environment).

As indicated, the scheduling task is preferably accomplished in two (or more) stages. At the lowest level of this hierarchical approach to scheduling, an aggregate planner is used. The aggregate plan produced thereby then provides heuristic guidance to/for a detailed scheduler that may be used to determine a detailed timeline and/or sequence for the job requests. The aggregate planner relies on a bin packing scheme wherein "bins" correspond to individual (or groups of) manufacturing processes, e.g., as represented by task nodes in the model of the manufacturing environment. The capacity of the bins is determined by the resources available to perform the processes they represent and may be weighted to account for differences between work shifts, operators, etc. The bin packing performed by the aggregate planner is, in essence, a route selection procedure and allows bottlenecks in the manufacturing environment to be identified. The bin packing is performed in multiple dimensions and alternative routes (i.e., contingencies) are accounted for to identify an optimal or viable plan.

The selection of which jobs to perform then is the task of the aggregate planner and the detailed scheduler. The manner in which this task is accomplished may be considered with reference to the following. Suppose N job requests are awaiting scheduling. The jobs may each have an inherent value V and a cost (with respect to a particular operation) to complete C (here, cost may be measured in time or other units). Thus, the N jobs may be plotted as a function of their values versus cost. The goal of any manufacturing environment (or at least the owners thereof) is to choose (i.e., schedule) the subset of the N jobs that will return the highest value without exceeding a cost threshold $C_{th}$.

Nominally, the number of all possible subsets of the N jobs is $2^N$. For any appreciable N, trying all possible solutions then becomes difficult and requires significant time to process (e.g., if every combination of subsets of the N jobs is to be evaluated to find the best total V without exceeding $C_{th}$). In a sense, the process of examining every combination of the jobs is a one-dimensional bin packing problem where a particular job J is either included in the solution or not. The order of the jobs is at this point irrelevant.

The aggregate planner accounts for the multidimensional aspect of the manufacturing environment. However, it must also account for the multiple alternative routes identified in the model. For example, any of a number of print machines may be used. Each of these printers may have different costs and each must be accounted for. Thus, the aggregate planner performs the multidimensional bin packing procedure for each alternative route until a best (or sometimes just an acceptable) subset of jobs is identified.

Returning now to FIG. 6, the updates 146 received by workflow engine 142 may come in a variety of forms. For example, the updates 146 may reflect job completions and/or partial completions (e.g., as individual tasks associated with jobs are completed). In addition, the updates 146 may reflect deviations from the workflows provided by scheduler 148. Such deviations may be encountered as a result of equipment failures, operator errors or inaccurate scheduling due to a lack of knowledge regarding parameters of a particular job. Whatever the reason, the deviations represent aberrations in the workflows 156 and should be accounted for.

The adaptive workflow system accounts for these deviations by having the workflow engine 142 update the model 144 to accurately reflect the true state of the real world (i.e., the actual state rather than just the projected state according to the previously produced workflows). Further, workflow engine 142 may issue reschedule commands 150, once a significant (which may be a user definable concept) deviation has been noted (alternatively, the model updates themselves may act a reschedule commands). This allows the workflows 156 to be rebuilt, based on the current state of the real world, as reflected in model 144. The newly bulit workflows 156 may then accommodate the prior deviations.

In some cases, it may be important to preserve as many aspects of prior workflows as possible in subsequent workflows (e.g., that are built in response to a reschedule command). Accordingly, the scheduler 148 may operate according to a constraint that requires as few variations as possible for in-progress (or other) jobs when carrying out a reschedule operation.

In other cases, it may be impossible or impractical to introduce only minor variations into a workflow, for example where an equipment failure prevents such actions. In such cases, scheduler 148 may make dramatic changes to the prior workflows in response to a reschedule command.

Although the foregoing specification and accompanying figures discuss and illustrate specific embodiments, it should be appreciated that the present invention is to be measured only in terms of the claims that follow.

What is claimed is:

1. A system, comprising:
   a scheduler, the scheduler comprising an aggregate planning level and a detailed scheduling level; and
   means for monitoring the current state of a schedule produced by the scheduler and the execution of the schedule in a physical environment, said means for monitoring comprising a virtual representation of a physical environment in which the schedule is to be executed, said virtual representation comprising an integrated bill of materials and bill of resources for said physical environment, said bill of materials comprising a number of state nodes and said bill of resources comprising a number of task nodes, with the task nodes and the state nodes alternating with one another along one or more paths, wherein the means for monitoring comprises a workflow engine configured to receive updates from the physical environment during execution of the schedule.

2. The system of claim 1 wherein the means for monitoring further comprises a virtual representation of the physical environment, the virtual representation being updateable by the workflow engine in response to the updates.

3. The system of claim 2 wherein the virtual representation of the physical environment comprises a model of a manufacturing environment.

4. The system of claim 2 wherein the virtual representation of the physical environment comprises a model of a print shop environment.

5. An adaptive workflow system, comprising:

a scheduling engine the scheduling engine comprising an aggregate planning level and a detailed scheduling level, configured to build workflows that describe a sequence of executing tasks to be performed in a dynamically changing environment; and a workflow engine configured to monitor the execution of the tasks within the environment and to provide the scheduling engine with information regarding deviations of task executions from the workflows so as to trigger the scheduling engine to build new workflows for as yet uncompleted ones of the tasks, said new workflows being built from a model of the environment, which model includes an integrated bill of materials and bill of resources for the environment, the bill of materials comprising a number of state nodes and the bill of resources comprising a number of task nodes, with the task nodes and the state nodes alternating with one another along one or more paths.

6. The adaptive workflow system of claim 5 wherein the information regarding deviations of tasks from the workflows is provided to the scheduling engine through the model of the environment.

7. The adaptive workflow system of claim 6 wherein the model comprises a directed graph, and each of the paths comprising an alternating series of one or more of the state nodes and one or more of the task nodes with any predecessor state node in one of the paths representing a precondition for a subsequent task node along the one of the paths and any following state node of the subsequent task node along the one of the paths representing a result of applying one or more actions that correspond to that task node.

8. The adaptive workflow system of claim 7 wherein the state nodes comprise virtual representations of inventory items of a manufacturing environment.

9. The adaptive workflow system of claim 7 wherein each of the second number of task nodes defines a virtual representation of a manufacturing process.

10. A system, comprising:

means for monitoring execution of workflows, comprised of an aggregate planning level and a detailed scheduling level, in a manufacturing environment, said means for monitoring comprising a virtual representation of the manufacturing environment which includes an integrated bill of materials and bill of resources for the manufacturing environment, the bill of materials comprising a number of state nodes and the bill of resources comprising a number of task nodes, with the task nodes and the state nodes alternating with one another along one or more paths; and means for updating the workflows based upon the execution thereof.

11. The system of claim 10 wherein the means for monitoring execution of workflows further comprises a workflow engine configured to receive updates regarding the execution of the workflows from the manufacturing environment; and wherein the means for updating the workflows comprises a scheduling engine configured to build the workflows according to a current state of the manufacturing environment as reflected by a virtual representation thereof.

12. The system of claim 11 wherein the scheduling engine comprises an aggregate planning level and a detailed scheduling level.

* * * * *